United States Patent
Miura et al.

(10) Patent No.: US 11,271,644 B2
(45) Date of Patent: Mar. 8, 2022

(54) OPTICAL SIGNAL CONTROL DEVICE AND OPTICAL COMMUNICATION SYSTEM

(71) Applicant: Mitsubishi Electric Corporation, Tokyo (JP)

(72) Inventors: Hiroshi Miura, Tokyo (JP); Naoki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/970,809

(22) PCT Filed: Mar. 20, 2018

(86) PCT No.: PCT/JP2018/011073
§ 371 (c)(1),
(2) Date: Aug. 18, 2020

(87) PCT Pub. No.: WO2019/180822
PCT Pub. Date: Sep. 26, 2019

(65) Prior Publication Data
US 2021/0111790 A1    Apr. 15, 2021

(51) Int. Cl.
*H04B 10/079* (2013.01)
*H04J 14/02* (2006.01)

(52) U.S. Cl.
CPC ........ *H04B 10/079* (2013.01); *H04J 14/0212* (2013.01)

(58) Field of Classification Search
CPC ... H04B 10/079; H04B 10/27; H04J 14/0212; H04J 14/02
See application file for complete search history.

(56) References Cited

U.S. PATENT DOCUMENTS 6,477,291 B1 * 11/2002 Ramadas ............ H04J 14/0212
                                                                      385/17
6,549,018 B1 *  4/2003 Bleck ................. H04B 10/0775
                                                                      324/628
(Continued)

FOREIGN PATENT DOCUMENTS

JP        2017-175186 A      9/2017

OTHER PUBLICATIONS

Bosco et al., "On the Performance of Nyquist—WDM Terabit Superchannels Based on PM-BPSK, PM-QPSK, PM-8QAM or PM-16QAM Subcarriers", Journal of Lightwave Technology, vol. 29, No. 1, Jan. 1, 2011, pp. 53-61.
(Continued)

*Primary Examiner* — Tanya T Motsinger
(74) *Attorney, Agent, or Firm* — Birch, Stewart, Kolasch & Birch, LLP

(57) ABSTRACT

An optical signal control device (70) is configured to include: a leakage amount calculating unit (83) calculating, from a light intensity measured by a first light intensity measuring unit (77) and a light intensity measured by a second light intensity measuring unit (78), a leakage amount of light leaking from other optical signals to each of optical signals included in a combined signal; and an attenuation amount calculating unit (84) calculating, from the light intensity measured by the second light intensity measuring unit (78) and the leakage mount of light, an attenuation amount of each of the optical signals included in the combined signal, and a wavelength selective switch (71) attenuates each of the optical signals included in the combined signal depending on the attenuation amount calculated by the attenuation amount calculating unit (84).

7 Claims, 8 Drawing Sheets

(56) References Cited

U.S. PATENT DOCUMENTS

| | | | |
|---|---|---|---|
| 6,634,807 B1* | 10/2003 | Al-Salameh | H04B 10/077 398/10 |
| 7,676,126 B2* | 3/2010 | McLaughlin | G02B 6/29313 385/18 |
| 8,280,206 B2* | 10/2012 | Hu | G02B 6/29395 385/18 |
| 8,320,758 B2 | 11/2012 | Cahill | |
| 2003/0210850 A1* | 11/2003 | DeAngelis | H04Q 11/0005 385/17 |
| 2004/0160596 A1* | 8/2004 | He | H04J 14/0227 356/73.1 |
| 2006/0275035 A1* | 12/2006 | Way | H04B 10/27 398/59 |
| 2007/0091310 A1* | 4/2007 | Hainberger | G02F 1/0136 356/364 |
| 2008/0232738 A1* | 9/2008 | Yang | H04J 14/0206 385/24 |
| 2014/0023316 A1* | 1/2014 | McLaughlin | G02B 6/3518 385/17 |
| 2014/0321796 A1* | 10/2014 | Ohtsuka | G02B 6/356 385/3 |
| 2015/0063798 A1* | 3/2015 | Mukai | H04J 14/0275 398/34 |
| 2018/0159627 A1* | 6/2018 | Fazal | H04B 10/25891 |
| 2019/0097749 A1 | 3/2019 | Oguma et al. | |
| 2021/0111790 A1* | 4/2021 | Miura | H04J 14/0212 |
| 2021/0327450 A1* | 10/2021 | Price | G06F 3/165 |

OTHER PUBLICATIONS

Kikuchi, "Digital coherent optical communication systems: fundamentals and future prospects", IEICE Electronics Express, vol. 8, No. 20, Oct. 2011, pp. 1642-1662.

Koga et al., "Design and Performance of an Optical Path Cross-Connect System Based on Wavelength Path Concept", Journal of Lightwave Technology, vol. 14, No. 6. Jun. 1996, pp. 1106-1119.

* cited by examiner

OPTICAL SIGNAL CONTROL DEVICE AND OPTICAL COMMUNICATION SYSTEM

TECHNICAL FIELD

The present invention relates to an optical signal control device for attenuating each optical signal of one or more channels, and an optical communication system in which multiple optical cross-connects are connected by transmission lines.

BACKGROUND ART

In trunk line network systems accommodating a large amount of traffic, optical fibers are often used.

In trunk line network systems, there are cases where wavelength division multiplexing (WDM) is used in order to improve the transmission capacity per optical fiber.

In a WDM scheme, WDM signals are generated by multiplexing multiple signals having wavelengths different from each other and thereby transmitted.

In addition, in order to improve the transmission capacity of WDM signals in trunk line network systems, there are cases where multiple signals are densely arranged on a wavelength axis by reducing the intervals between wavelengths assigned to the multiple signals that are multiplexed into WDM signals. The technology of transmitting a WDM signal by arranging multiple signals at high density on a wavelength axis is called dense WDM (DWDM) transmission technology.

However, in a case where the DWDM transmission technology is used in a trunk line network system, there are cases where the transmission characteristics of the trunk line network system are deteriorated due to a level deviation of optical power generated among the multiple signals.

Patent Literature 1 below discloses an optical communication system for controlling a variable optical attenuator in an optical cross-connect in such a manner that each of optical levels of multiple subcarrier signals included in one wavelength group signal is included in a target range.

In the optical communication system disclosed in Patent Literature 1, deterioration of transmission characteristics is suppressed by including each of the optical levels of the multiple subcarrier signals in a target range.

CITATION LIST

Patent Literature

Patent Literature 1: JP 2017-175186 A

SUMMARY OF INVENTION

Technical Problem

In conventional optical communication systems, the level of leaked light cannot be detected when a part of light in a subcarrier signal leaks into an adjacent subcarrier, and thus the leaked light cannot be removed.

Conventional optical communication systems have a disadvantage that subcarrier signals having an error in optical levels are transmitted since leaked light cannot be removed.

The present invention has been made to solve the above-described disadvantage, and an object of the present invention is to obtain an optical signal control device and an optical communication system capable of reducing an error in light intensity in each of one or more optical signals included in a combined signal.

Solution to Problem

An optical signal control device according to the present invention includes: a wavelength selective switch outputting a combined signal obtained by combining all the wavelength division multiplexed signals to an output-side transmission line when wavelength division multiplexed signals, in which one or more optical signals are multiplexed, are transmitted through one or more input-side transmission lines; a first light intensity measuring unit measuring a light intensity of the combined signal; a second light intensity measuring unit measuring a light intensity of each of optical signals included in the combined signal; a leakage amount calculating unit calculating, from the light intensity measured by the first light intensity measuring unit and the light intensity measured by the second light intensity measuring unit, a leakage amount of light leaking from other optical signals to each of the optical signals included in the combined signal; and an attenuation amount calculating unit calculating, from the light intensity measured by the second light intensity measuring unit and the leakage amount of light, an attenuation amount of each of the optical signals included in the combined signal, and the wavelength selective switch attenuates each of the optical signals included in the combined signal depending on the attenuation amount calculated by the attenuation amount calculating unit.

Advantageous Effects of Invention

According to the present invention, a device is configured to include: a leakage amount calculating unit calculating, from the light intensity measured by the first light intensity measuring unit and the light intensity measured by the second light intensity measuring unit, a leakage amount of light leaking from other optical signals to each of the optical signals included in the combined signal; and an attenuation amount calculating unit calculating, from the light intensity measured by the second light intensity measuring unit and the leakage amount of light, an attenuation amount of each of the optical signals included in the combined signal, and the wavelength selective switch attenuates each of the optical signals included in the combined signal depending on the attenuation amount calculated by the attenuation amount calculating unit. Therefore, the optical signal control device according to the present invention can reduce an error in light intensity in each of one or more optical signals included in a combined signal.

BRIEF DESCRIPTION OF DRAWINGS

FIG. 5 is a hardware configuration diagram of a computer in a case where the controller 82 is implemented by software, firmware, or the like.

DESCRIPTION OF EMBODIMENTS

To describe the present invention further in detail, embodiments for carrying out the present invention will be described below referring to the accompanying drawings.

First Embodiment

Figure 1:
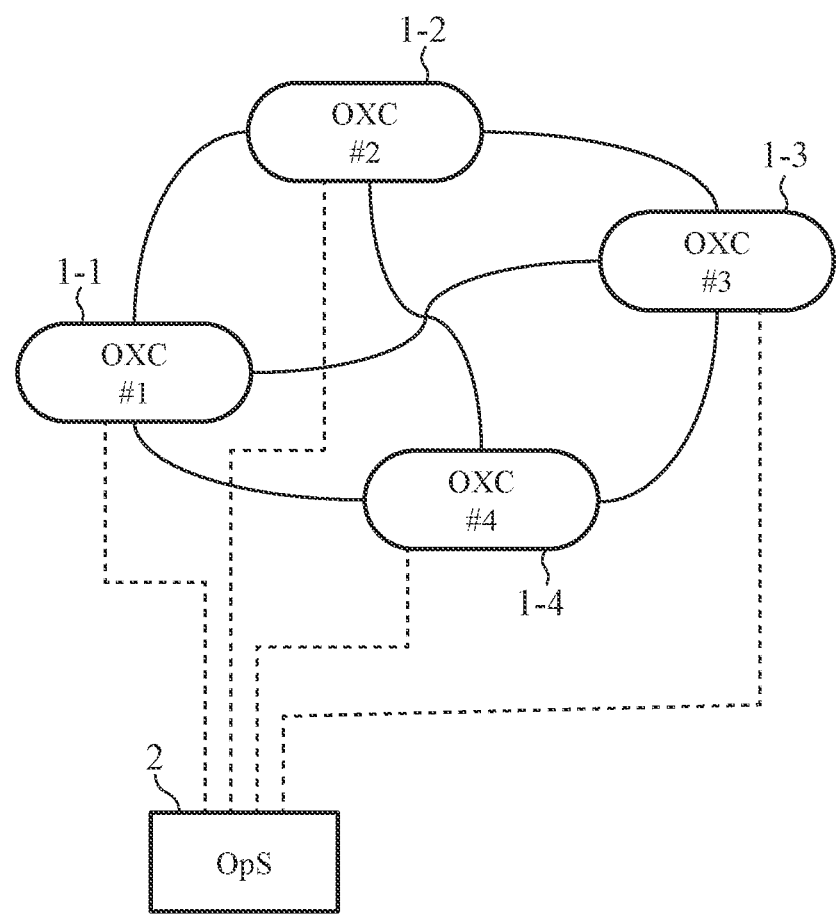
FIG. 1 is a configuration diagram illustrating an optical communication system according to a first embodiment.

FIG. 1 is a configuration diagram illustrating an optical communication system according to a first embodiment.

FIG. 1 illustrates an example in which the optical communication system includes four optical cross-connects (OXCs).

Each of the OXCs 1-1 to 1-4 is connected to other three OXCs among the OXCs 1-1 to 1-4 via optical fibers.

Each of the OXCs 1-1 to 1-4 multiplexes wavelength division multiplexed signals transmitted from each of one or more other OXCs to generate a combined signal, and transmits the combined signal to another OXC that is different from the source OXC.

Each of the OXCs 1-1 to 1-4 also demultiplexes a wavelength division multiplexed signal transmitted from another OXC into each channel to generate one or more demultiplexed signals and transmits each of the demultiplexed signals to other OXCs different from the source OXC.

A wavelength division multiplexed signal is a signal in which one or more optical signals to which different wavelengths are assigned are multiplexed.

As optical signals multiplexed into a wavelength division multiplexed signal, an optical signal assigned with wavelength $\lambda_1$, an optical signal assigned with wavelength $\lambda_2$, an optical signal assigned with wavelength $\lambda_3$, and the like can be considered.

In each of the OXCs 1-1 to 1-4, a source and a destination of a wavelength division multiplexed signal, a combined signal, and a demultiplexed signal (hereinafter, simply referred to as "signal source/destination") are set by an OpS 2 which is an operation system.

For example, in the OXC 1-1, the content that "receives a wavelength division multiplexed signal transmitted from each of the OXC 1-3 and the OXC 1-4 and transmits the combined signal to the OXC 1-2" is set as the signal source/destination.

The OXC 1-1 receives wavelength division multiplexed signals transmitted from each of the OXC 1-3 and the OXC 1-4 in a case where the signal source/destination is set as described above, and generates a combined signal by combining those wavelength division multiplexed signals and transmits the combined signal to the OXC 1-2.

The OpS 2 is a device that sets a signal source/destination to each of the OXCs 1-1 to 1-4.

Note that switching of the signal source/destination by the OpS 2 is performed, for example, every several hours or every several days.

Figure 2:
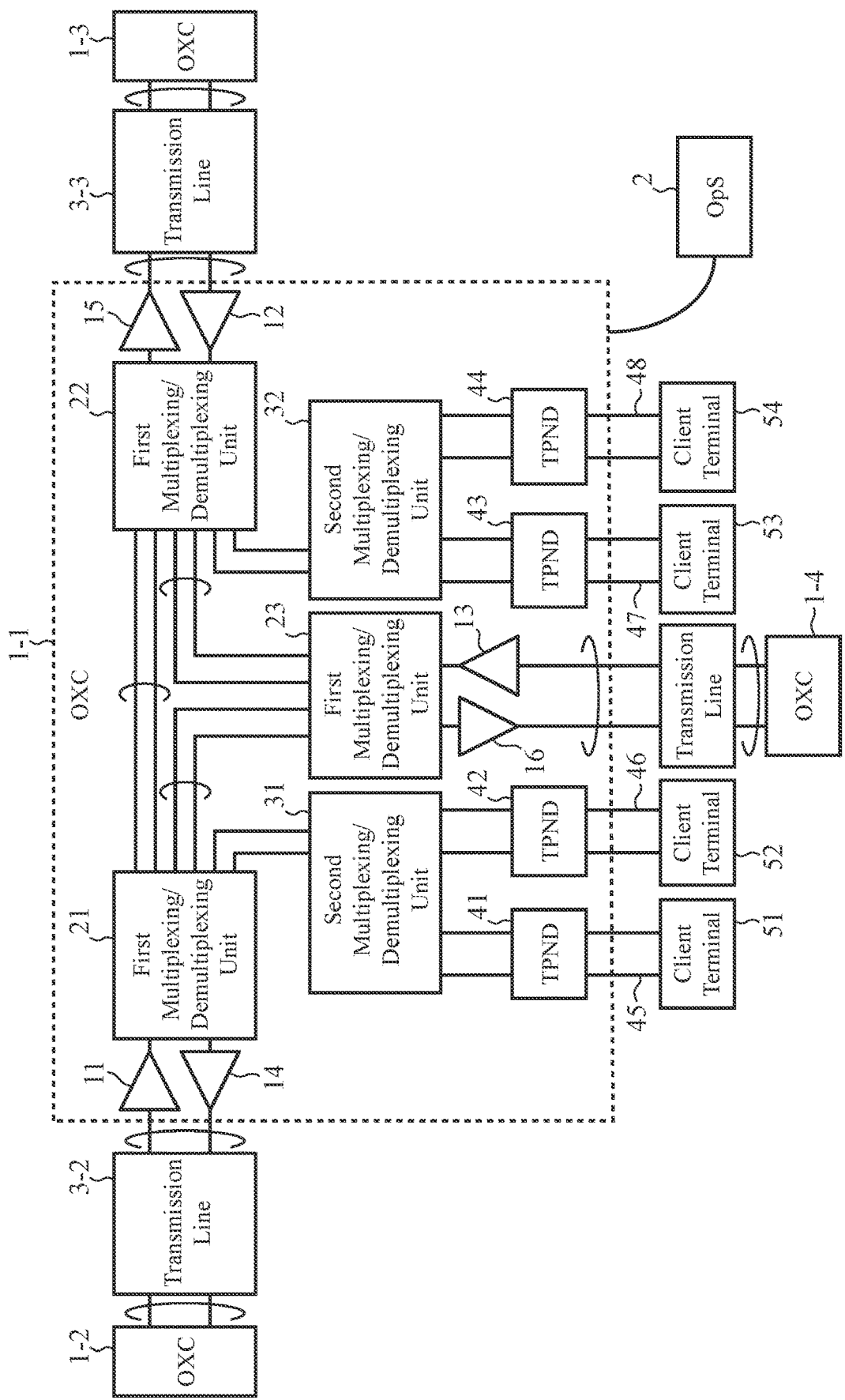
FIG. 2 is a configuration diagram illustrating OXCs included in the optical communication system according to the first embodiment.

FIG. 2 is a configuration diagram illustrating the OXCs included in the optical communication system according to the first embodiment.

The optical communication system illustrated in FIG. 2 includes four OXCs 1-1 to 1-4.

In the optical communication system illustrated in FIG. 2, the OXCs 1-2 to 1-4 are connected to the OXC 1-1 via transmission lines 3-2 to 3-4, respectively.

In the optical communication system illustrated in FIG. 2, the internal configuration of the OXC 1-1 is illustrated. The internal configurations of the OXCs 1-2 to 1-4 are the same as the internal configuration of the OXC 1-1. Here, the internal configuration of the OXC 1-1 will be described.

Each of the transmission lines 3-2 to 3-4 includes two optical fibers separate for each transmission direction of a wavelength division multiplexed signal, a combined signal, and a demultiplexed signal. However, this is merely an example, and each of the transmission lines 3-2 to 3-4 may include a single optical fiber, and the single optical fiber may implement bidirectional transmission of a wavelength division multiplexed signal or the like.

An optical amplifier 11 amplifies a wavelength division multiplexed signal transmitted from the OXC 1-2 via the transmission line 3-2, and outputs the amplified wavelength division multiplexed signal to a first multiplexing/demultiplexing unit 21.

An optical amplifier 12 amplifies a wavelength division multiplexed signal transmitted from the OXC 1-3 via the transmission line 3-3, and outputs the amplified wavelength division multiplexed signal to a first multiplexing/demultiplexing unit 22.

An optical amplifier 13 amplifies a wavelength division multiplexed signal transmitted from the OXC 1-4 via the transmission line 3-4, and outputs the amplified wavelength division multiplexed signal to a first multiplexing/demultiplexing unit 23.

An optical amplifier 14 amplifies a combined signal output from the first multiplexing/demultiplexing unit 21, and outputs the amplified combined signal to the OXC 1-2 via the transmission line 3-2.

An optical amplifier 15 amplifies a combined signal output from the first multiplexing/demultiplexing unit 22, and outputs the amplified combined signal to the OXC 1-3 via the transmission line 3-3.

An optical amplifier 16 amplifies a combined signal output from the first multiplexing/demultiplexing unit 23, and outputs the amplified combined signal to the OXC 1-4 via the transmission line 3-4.

The first multiplexing/demultiplexing unit 21 demultiplexes a wavelength division multiplexed signal output from the optical amplifier 11 into each channel, and outputs each of the demultiplexed signals to, for example, the first multiplexing/demultiplexing unit 22, the first multiplexing/demultiplexing unit 23, or a second multiplexing/demultiplexing unit 31.

The first multiplexing/demultiplexing unit 21 also combines demultiplexed signals output from, for example, each of the first multiplexing/demultiplexing unit 22, the first multiplexing/demultiplexing unit 23, and the second multiplexing/demultiplexing unit 31, and outputs the combined signal to the optical amplifier 14.

The first multiplexing/demultiplexing unit 22 demultiplexes a wavelength division multiplexed signal output from the optical amplifier 12 into each channel, and outputs each of the demultiplexed signals to, for example, the first multiplexing/demultiplexing unit 21, the first multiplexing/demultiplexing unit 23, or a second multiplexing/demultiplexing unit 32.

The first multiplexing/demultiplexing unit 22 also combines demultiplexed signals output from, for example, each of the first multiplexing/demultiplexing unit 21, the first multiplexing/demultiplexing unit 23, and the second multiplexing/demultiplexing unit 32, and outputs the combined signal to the optical amplifier 15.

The first multiplexing/demultiplexing unit 23 demultiplexes a wavelength division multiplexed signal output from the optical amplifier 13 into each channel, and outputs each of the demultiplexed signals to, for example, the first multiplexing/demultiplexing unit 21 or the first multiplexing/demultiplexing unit 22.

The first multiplexing/demultiplexing unit 23 also combines demultiplexed signals output from, for example, each of the first multiplexing/demultiplexing unit 21 and the first multiplexing/demultiplexing unit 22, and outputs the combined signal to the optical amplifier 16.

Source/destinations of a wavelength division multiplexed signal, a combined signal, and a demultiplexed signal in each of the first multiplexing/demultiplexing units 21 to 23 are determined depending on a signal source/destination set by the OpS 2.

The second multiplexing/demultiplexing unit 31 demultiplexes a wavelength division multiplexed signal, which includes one or more demultiplexed signals output from the first multiplexing/demultiplexing unit 21, into each channel, and outputs each of the demultiplexed signals to a TPND 41 or a TPND 42 which are repeaters.

Further, the second multiplexing/demultiplexing unit 31 combines, for example, wavelength division multiplexed signals output from each of the TPND 41 and the TPND 42, and outputs the combined signal to the first multiplexing/demultiplexing unit 21.

The second multiplexing/demultiplexing unit 32 demultiplexes a wavelength division multiplexed signal, which includes one or more demultiplexed signals output from the first multiplexing/demultiplexing unit 22, into each channel, and outputs each of the demultiplexed signals to a TPND 43 or a TPND 44.

Further, the second multiplexing/demultiplexing unit 32 combines, for example, wavelength division multiplexed signals output from each of the TPND 43 and the TPND 44, and outputs the combined signal to the first multiplexing/demultiplexing unit 22.

Source/destinations of a wavelength division multiplexed signal, a combined signal, and a demultiplexed signal in each of the second multiplexing/demultiplexing units 31 to 32 are determined depending on a signal source/destination set by the OpS 2.

The TPND 41 is a repeater interposed between the second multiplexing/demultiplexing unit 31 and a client terminal 51.

The TPND 41 outputs a demultiplexed signal output from the second multiplexing/demultiplexing unit 31 to the client terminal 51, and outputs a wavelength division multiplexed signal output from the client terminal 51 to the second multiplexing/demultiplexing unit 31.

The TPND 42 is a repeater interposed between the second multiplexing/demultiplexing unit 31 and a client terminal 52.

The TPND 43 is a repeater interposed between the second multiplexing/demultiplexing unit 32 and a client terminal 53.

The TPND 44 is a repeater interposed between the second multiplexing/demultiplexing unit 32 and a client terminal 54.

Each of the TPNDs 42 to 44 inputs and outputs a demultiplexed signal and a wavelength division multiplexed signal like the TPND 41 does.

Communication paths 45 to 48 are transmission lines connecting the TPNDs 41 to 44 and the client terminals 51 to 54, respectively. The TPNDs 41 to 44 and the client terminals 51 to 54 are connected via the communication paths 45 to 48, respectively.

Each of the communication paths 45 to 48 may be an optical fiber or an electric signal line.

Each of the client terminals 51 to 54 is used by a user.

Figure 3:
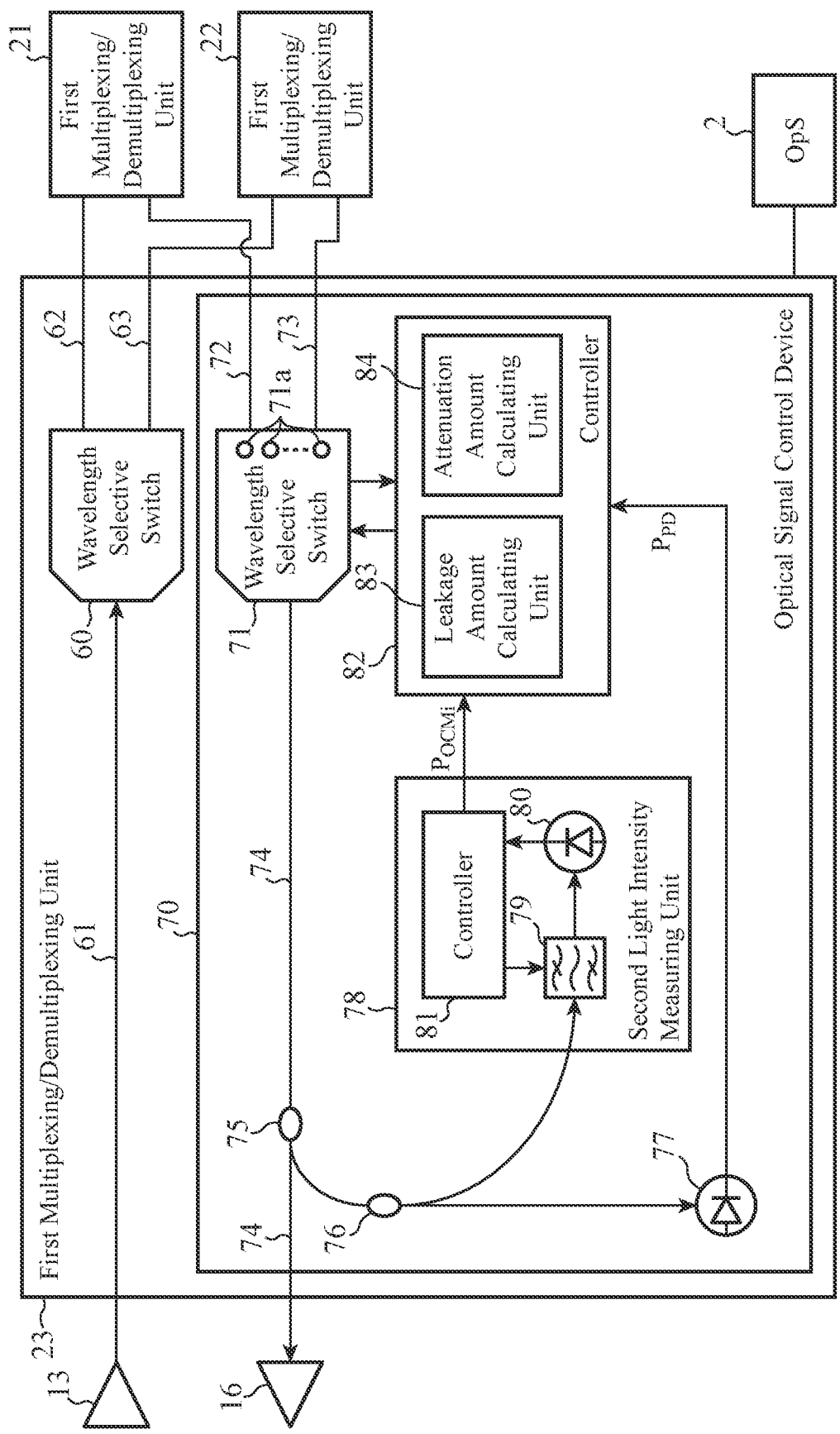
FIG. 3 is a configuration diagram illustrating a first multiplexing/demultiplexing unit 23 including an optical signal control device 70 according to the first embodiment.

FIG. 3 is a configuration diagram illustrating the first multiplexing/demultiplexing unit 23 including an optical signal control device 70 according to the first embodiment.

The configuration of the first multiplexing/demultiplexing unit 21 and the first multiplexing/demultiplexing unit 22 are similar to the configuration of the first multiplexing/demultiplexing unit 23.

The first multiplexing/demultiplexing unit 23 includes a wavelength selective switch 60 and an optical signal control device 70.

The wavelength selective switch 60 is connected with the optical amplifier 13 via an optical fiber 61, connected with the first multiplexing/demultiplexing unit 21 via an optical fiber 62, and connected with the first multiplexing/demultiplexing unit 22 via an optical fiber 63.

The wavelength selective switch 60 is a wavelength selective switch (WSS) for demultiplexing a wavelength division multiplexed signal output from the optical amplifier 13 into each channel.

The wavelength selective switch 60 outputs each of the demultiplexed signals to, for example, the first multiplexing/demultiplexing unit 21 or the first multiplexing/demultiplexing unit 22.

The destination of the demultiplexed signal in the wavelength selective switch 60 is determined depending on the signal source/destination set by the OpS 2.

The optical signal control device 70 executes feedback control, and includes a wavelength selective switch 71, optical multiplexing/demultiplexing elements 75 and 76, a first light intensity measuring unit 77, a second light intensity measuring unit 78, and a controller 82.

The wavelength selective switch 71 is connected with the first multiplexing/demultiplexing unit 21 via an input-side transmission line 72, connected with the first multiplexing/demultiplexing unit 22 via an input-side transmission line 73, and connected with the optical multiplexing/demultiplexing element 75 via an output-side transmission line 74.

The wavelength selective switch 71 combines demultiplexed signals output from, for example, each of the first multiplexing/demultiplexing unit 21 and the first multiplexing/demultiplexing unit 22, and outputs the combined signal to the output-side transmission line 74.

The source of the demultiplexed signal in the wavelength selective switch 71 is determined depending on the signal source/destination set by the OpS 2.

The combined signal generated by combining the demultiplexed signals includes one or more optical signals.

The wavelength selective switch 71 outputs, to the controller 82, wavelength information indicating the wavelength assigned to each of the one or more optical signals.

Here, the wavelength assigned to an optical signal means a wavelength assigned to a channel for transmission and reception of the optical signal.

The wavelength selective switch 71 includes one or more variable optical attenuators 71a. The one or more variable optical attenuators 71a attenuate each of the multiple optical signals to be included in the combined signal.

The input-side transmission line 72, the input-side transmission line 73, and the output-side transmission line 74 are all optical fibers.

The optical multiplexing/demultiplexing element 75 demultiplexes the combined signal output from the wavelength selective switch 71 to the output-side transmission line 74, and outputs a part of the combined signal to the optical multiplexing/demultiplexing element 76.

The optical multiplexing/demultiplexing element 76 further demultiplexes a part of the combined signal output from the optical multiplexing/demultiplexing element 75 into two. The optical multiplexing/demultiplexing element 76 outputs one of the two combined signals generated after the demultiplexing into two to the first light intensity measuring unit 77, and outputs the other one of the combined signals to the second light intensity measuring unit 78.

In FIG. 3, an example is illustrated in which the optical signal control device 70 includes the optical multiplexing/demultiplexing element 75 and the optical multiplexing/demultiplexing element 76 that are independent from each other. However, this is merely an example, and the optical signal control device 70 may include an element in which the optical multiplexing/demultiplexing element 75 and the optical multiplexing/demultiplexing element 76 are integrated.

The first light intensity measuring unit 77 is implemented by, for example, a photodiode (PD).

The first light intensity measuring unit 77 measures the light intensity of the combined signal output from the optical multiplexing/demultiplexing element 76, and outputs a measurement value $P_{PD}$ indicating the light intensity of the combined signal to the controller 82.

A second light intensity measuring unit 78 includes a wavelength tunable filter 79, a photodiode 80, and a controller 81.

The second light intensity measuring unit 78 measures the light intensity of each optical signal included in the combined signal output from the optical multiplexing/demultiplexing element 76.

For example, in a case where optical signals of channels (1) to (N) are included in the combined signal, the second light intensity measuring unit 78 measures the light intensity of each of the optical signals of channels (1) to (N).

The wavelength tunable filter 79 extracts an optical signal of channel (i) indicated by a channel selection signal output from the controller 81 out of the multiple optical signals included in the combined signal, and outputs the extracted optical signal to the photodiode 80. For example, i=1, 2, ..., N.

Note that a wavelength $\lambda_i$ assigned to the optical signal of channel (i) is adjacent to a wavelength $\lambda_{i-1}$ assigned to an optical signal of channel (i−1) and a wavelength $\lambda_{i+1}$ assigned to an optical signal of channel (i+1).

The photodiode 80 measures the intensity of the optical signal of channel (i) output from the wavelength tunable filter 79, and outputs a measurement value $P_{OCMi}$ indicating the intensity of the optical signal of channel (i) to the controller 81.

The controller 81 repeatedly outputs, to the wavelength tunable filter 79, the channel selection signal indicating a channel of which optical signal is to be extracted until the light intensity of all the optical signals of the multiple channels included in the combined signal output from the optical multiplexing/demultiplexing element 76 are measured.

When having received the measurement value $P_{OCMi}$ from the photodiode 80, the controller 81 outputs the measurement value $P_{OCMi}$ to the controller 82.

The controller 82 includes a leakage amount calculating unit 83 and an attenuation amount calculating unit 84.

Figure 4:
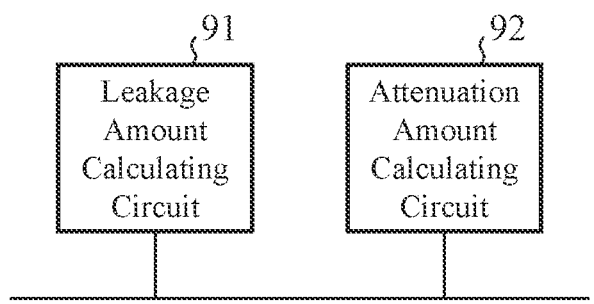
FIG. 4 is a hardware configuration diagram illustrating hardware of a controller 82.

FIG. 4 is a hardware configuration diagram illustrating hardware of the controller 82.

The leakage amount calculating unit 83 is implemented by, for example, a leakage amount calculating circuit 91 illustrated in FIG. 4.

The leakage amount calculating unit 83 acquires the wavelength information output from the wavelength selective switch 71.

The leakage amount calculating unit 83 performs the process of calculating the leakage amount of light leaked, from optical signals of other channels, to each of optical signals of the one or more channels included in the combined signal on the basis of the measurement value $P_{PD}$, the measurement value $P_{OCMi}$, and the wavelength information.

The attenuation amount calculating unit 84 is implemented by, for example, an attenuation amount calculating circuit 92 illustrated in FIG. 4.

The attenuation amount calculating unit 84 performs the process of calculating the attenuation amount of each of the optical signals included in the combined signal on the basis of the measurement value $P_{OCMi}$ output from the second light intensity measuring unit 78 and the leakage amount of light calculated by the leakage amount calculating unit 83.

The attenuation amount calculating unit 84 outputs the attenuation amount of each of the optical signals included in the combined signal to the wavelength selective switch 71.

Each of the variable optical attenuators 71a included in the wavelength selective switch 71 attenuates each of the optical signals included in the combined signal depending on the attenuation amount output from the attenuation amount calculating unit 84.

In FIG. 3, it is assumed that the leakage amount calculating unit 83 and the attenuation amount calculating unit 84, which are components of the controller 82, are each implemented by dedicated hardware as illustrated in FIG. 4. That is, it is assumed that the controller 82 is implemented by the leakage amount calculating circuit 91 and the attenuation amount calculating circuit 92.

Here, each of the leakage amount calculating circuit 91 and the attenuation amount calculating circuit 92 corresponds to, for example, a single circuit, a composite circuit, a programmed processor, a parallel programmed processor, an application specific integrated circuit (ASIC), a field-programmable gate array (FPGA), or a combination thereof.

The components of the controller 82 are not limited to those implemented by dedicated hardware, and the controller 82 may be implemented by software, firmware, or a combination of software and firmware.

The software or the firmware is stored in a memory of a computer as a program. Here, a computer refers to hardware for executing the program and corresponds to, for example, a central processing unit (CPU), a central processing device, a processing device, an arithmetic device, a microprocessor, a microcomputer, a processor, or a digital signal processor (DSP).

Figure 5:
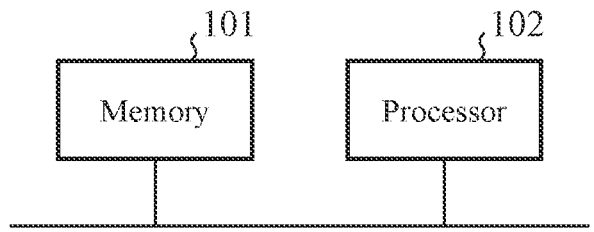

FIG. 5 is a hardware configuration diagram of a computer in a case where the controller 82 is implemented by software, firmware, or the like.

In a case where the controller 82 is implemented by software, firmware, or the like, a program for causing a computer to execute the processing procedure of the leakage amount calculating unit 83 and the attenuation amount calculating unit 84 is stored in a memory 101. A processor 102 of the computer executes the program stored in the memory 101.

In FIG. 4, an example is illustrated in which each of the components of the controller 82 is implemented by dedicated hardware, and in FIG. 5, an example is illustrated in which the controller 82 is implemented by software, firmware, or the like; however, a part of the components of the controller 82 may be implemented by dedicated hardware and the rest of the components may be implemented by software, firmware, or the like.

Figure 6:
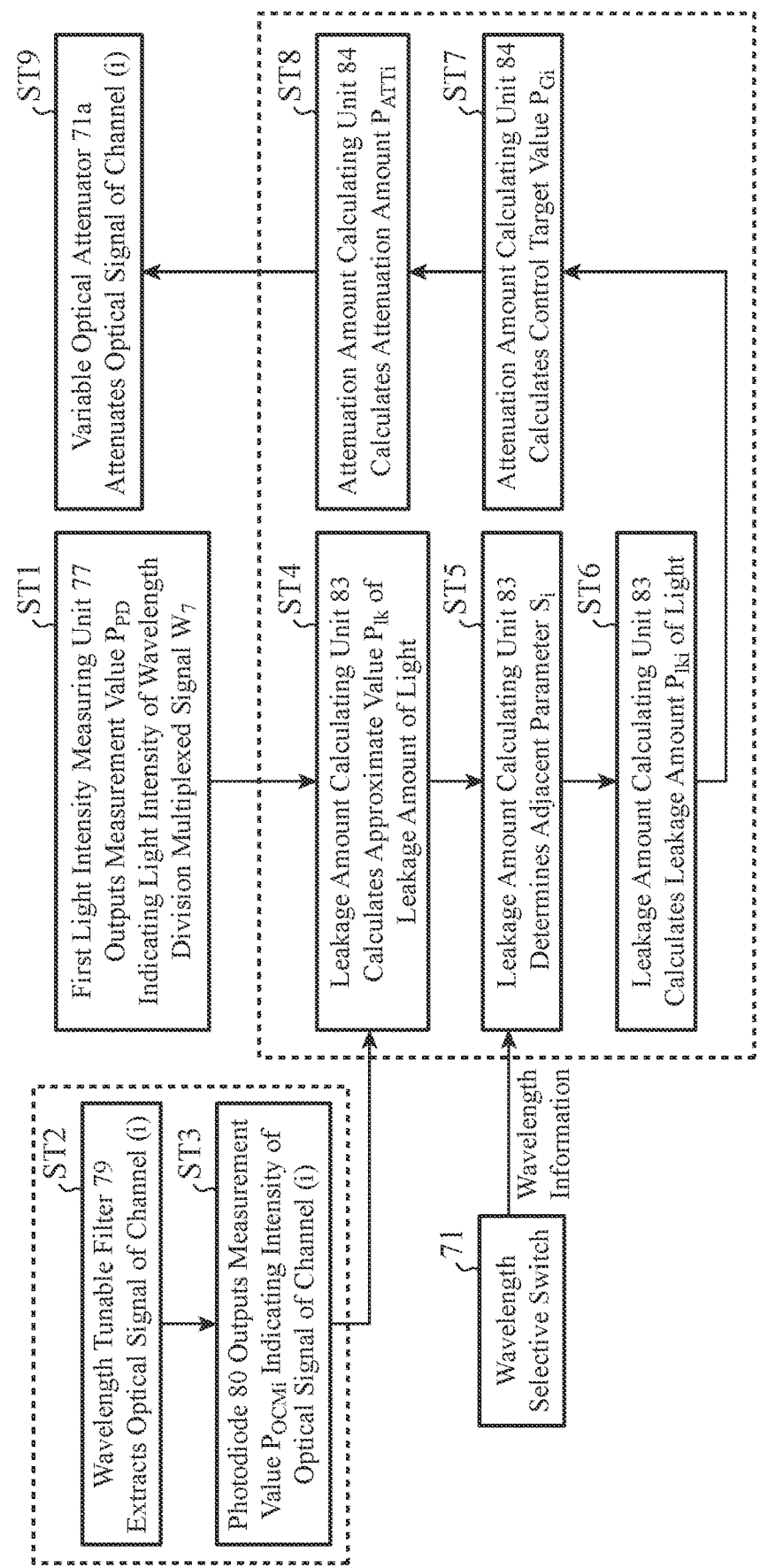
FIG. 6 is a flowchart illustrating the contents of processes of a wavelength selective switch 71, a first light intensity measuring unit 77, a second light intensity measuring unit 78, and the controller 82.

FIG. 6 is a flowchart illustrating the contents of processes of the wavelength selective switch 71, the first light intensity measuring unit 77, the second light intensity measuring unit 78, and the controller 82.

Next, the operation of the OXC 1-1 and the like illustrated in FIG. 2 will be described referring to FIG. 6.

The OpS 2 sets a signal source/destination to each of the OXCs 1-1 to 1-4.

In the first embodiment, for convenience of explanation, it is assumed that signal sources/destinations set by the OpS 2 are as follows.

[1] The OXC 1-2 transmits, to the OXC 1-1, a wavelength division multiplexed signal $W_1$ in which an optical signal of channel (1), an optical signal of channel (3), an optical signal of channel (5), and an optical signal of channel (7) are multiplexed.

The OXC 1-1 transmits the optical signal of channel (1) included in the wavelength division multiplexed signal $W_1$ to the client terminal 51.

The OXC 1-1 transmits the optical signal of channel (3) included in the wavelength division multiplexed signal $W_1$ to the client terminal 52.

The OXC 1-1 transmits each of the optical signal of channel (5) and the optical signal of channel (7) included in the wavelength division multiplexed signal $W_1$ to the OXC 1-4.

[2] The OXC 1-3 transmits, to the OXC 1-1, a wavelength division multiplexed signal $W_2$ in which an optical signal of channel (2), an optical signal of channel (4), an optical signal of channel (6), and an optical signal of channel (8) are multiplexed.

The OXC 1-1 transmits the optical signal of channel (2) included in the wavelength division multiplexed signal $W_2$ to the client terminal 53.

The OXC 1-1 transmits the optical signal of channel (4) included in the wavelength division multiplexed signal $W_2$ to the client terminal 54.

The OXC 1-1 transmits each of the optical signal of channel (6) and the optical signal of channel (8) included in the wavelength division multiplexed signal $W_2$ to the OXC 1-4.

The OXC 1-2 transmits the wavelength division multiplexed signal $W_1$ to the OXC 1-1 by outputting the wavelength division multiplexed signal $W_1$ to the transmission line 3-2.

The optical amplifier 11 of the OXC 1-1 amplifies the wavelength division multiplexed signal $W_1$ transmitted from the OXC 1-2 via the transmission line 3-2, and outputs the amplified wavelength division multiplexed signal $W_1$ to the first multiplexing/demultiplexing unit 21.

The first multiplexing/demultiplexing unit 21 demultiplexes the wavelength division multiplexed signal $W_1$ output from the optical amplifier 11 into each channel. By the demultiplexing of the wavelength division multiplexed signal $W_1$, the optical signal of channel (1), the optical signal of channel (3), the optical signal of channel (5), and the optical signal of channel (7) are each generated as a demultiplexed signal.

The first multiplexing/demultiplexing unit 21 outputs, to the second multiplexing/demultiplexing unit 31, a wavelength division multiplexed signal $W_3$ in which the optical signal of channel (1) and the optical signal of channel (3) are multiplexed.

The first multiplexing/demultiplexing unit 21 outputs, to the first multiplexing/demultiplexing unit 23, a wavelength division multiplexed signal $W_4$ in which the optical signal of channel (5) and the optical signal of channel (7) are multiplexed.

The OXC 1-3 transmits the wavelength division multiplexed signal $W_2$ to the OXC 1-1 by outputting the wavelength division multiplexed signal $W_2$ to the transmission line 3-3.

The optical amplifier 12 of the OXC 1-1 amplifies the wavelength division multiplexed signal $W_2$ transmitted from the OXC 1-3 via the transmission line 3-3, and outputs the amplified wavelength division multiplexed signal $W_2$ to the first multiplexing/demultiplexing unit 22.

The first multiplexing/demultiplexing unit 22 demultiplexes the wavelength division multiplexed signal $W_2$ output from the optical amplifier 12 into each channel. By the demultiplexing of the wavelength division multiplexed signal $W_2$, the optical signal of channel (2), the optical signal of channel (4), the optical signal of channel (6), and the optical signal of channel (8) are each generated as a demultiplexed signal.

The first multiplexing/demultiplexing unit 22 outputs, to the second multiplexing/demultiplexing unit 32, a wavelength division multiplexed signal $W_5$ in which the optical signal of channel (2) and the optical signal of channel (4) are multiplexed.

The first multiplexing/demultiplexing unit 22 outputs, to the first multiplexing/demultiplexing unit 23, a wavelength division multiplexed signal $W_6$ in which the optical signal of channel (6) and the optical signal of channel (8) are multiplexed.

The second multiplexing/demultiplexing unit 31 demultiplexes the wavelength division multiplexed signal $W_3$ output from the first multiplexing/demultiplexing unit 21 into each channel. By the demultiplexing of the wavelength division multiplexed signal $W_3$, the optical signal of channel (1) and the optical signal of channel (3) are each generated as a demultiplexed signal.

The second multiplexing/demultiplexing unit 31 transmits the optical signal of channel (1) to the TPND 41.

Further, the second multiplexing/demultiplexing unit 31 transmits the optical signal of channel (3) to the TPND 42.

The TPND 41 transmits the optical signal of channel (1) output from the second multiplexing/demultiplexing unit 31 to the client terminal 51.

The TPND 42 transmits the optical signal of channel (3) output from the second multiplexing/demultiplexing unit 31 to the client terminal 52.

The second multiplexing/demultiplexing unit 32 demultiplexes the wavelength division multiplexed signal $W_5$ output from the first multiplexing/demultiplexing unit 22 into each channel. By the demultiplexing of the wavelength division multiplexed signal $W_5$, the optical signal of channel (2) and the optical signal of channel (4) are each generated as a demultiplexed signal.

The second multiplexing/demultiplexing unit 32 transmits the optical signal of channel (2) to the TPND 43.

Further, the second multiplexing/demultiplexing unit 32 transmits the optical signal of channel (4) to the TPND 44.

The TPND 43 transmits the optical signal of channel (2) output from the second multiplexing/demultiplexing unit 32 to the client terminal 53.

The TPND 44 transmits the optical signal of channel (4) output from the second multiplexing/demultiplexing unit 32 to the client terminal 54.

The wavelength selective switch 71 of the first multiplexing/demultiplexing unit 23 combines the wavelength division multiplexed signal $W_4$ output from the first multiplexing/demultiplexing unit 21 and the wavelength division multiplexed signal $W_6$ output from the first multiplexing/demultiplexing unit 22. The combined signal obtained by combining the wavelength division multiplexed signal $W_4$ and the wavelength division multiplexed signal $W_6$ is hereinafter referred to as a wavelength division multiplexed signal $W_7$.

The wavelength division multiplexed signal $W_7$ is a combined signal obtained by multiplexing the optical signal of channel (5), the optical signal of channel (6), the optical signal of channel (7), and the optical signal of channel (8).

When combining the wavelength division multiplexed signal $W_4$ and the wavelength division multiplexed signal $W_6$, the wavelength selective switch 71 attenuates each of the optical signals of channels (5) to (8) by using one or more variable optical attenuators 71a.

The details of the attenuation of the optical signals of channels (5) to (8) by the variable optical attenuator 71a will be described later.

The wavelength selective switch 71 outputs the wavelength division multiplexed signal $W_7$ to the output-side transmission line 74.

Furthermore, the wavelength selective switch 71 outputs, to the controller 82, wavelength information indicating the wavelength assigned to each of the one or more optical signals included in the wavelength division multiplexed signal $W_7$.

Since the optical signals included in the wavelength division multiplexed signal $W_7$ are optical signals of channels (5) to (8), the wavelength selective switch 71 outputs information indicating wavelengths $\lambda_5$, $\lambda_6$, $\lambda_7$, and $\lambda_8$ assigned to the optical signals of channels (5) to (8), respectively, as wavelength information.

The optical multiplexing/demultiplexing element 75 demultiplexes the wavelength division multiplexed signal $W_7$ output from the wavelength selective switch 71 to the output-side transmission line 74, and outputs a part of the wavelength division multiplexed signal $W_7$ to the optical multiplexing/demultiplexing element 76.

The optical multiplexing/demultiplexing element 76 further demultiplexes a part of the wavelength division multiplexed signal $W_7$ output from the optical multiplexing/demultiplexing element 75 into two. The optical multiplexing/demultiplexing element 76 outputs one of the two wavelength division multiplexed signals $W_7$ generated after the demultiplexing into two to the first light intensity measuring unit 77, and outputs the other wavelength division multiplexed signal $W_7$ to the second light intensity measuring unit 78.

The first light intensity measuring unit 77 measures the light intensity of the wavelength division multiplexed signal $W_7$ output from the optical multiplexing/demultiplexing element 76, and outputs the measurement value $P_{PD}$ indicating the light intensity of the wavelength division multiplexed signal $W_7$ to the controller 82 (step ST1 in FIG. 6).

The controller 81 of the second light intensity measuring unit 78 repeatedly outputs, to the wavelength tunable filter 79, a channel selection signal indicating channel (i) of which optical signal is to be extracted until measurement of the light intensity of the optical signals of channels (5) to (8) included in the wavelength division multiplexed signal $W_7$ is completed.

Since the optical signals multiplexed in the wavelength division multiplexed signal $W_7$ are the optical signals of channels (5) to (8), i=5, 6, 7, and 8.

The wavelength tunable filter 79 extracts the optical signal of channel (i) from the wavelength division multiplexed signal $W_7$ by sweeping transmission wavelengths of the optical signals with the wavelength L corresponding to channel (i) indicated by the channel selection signal output from the controller 81 (step ST2 in FIG. 6).

The wavelength tunable filter 79 outputs the extracted optical signal of channel (i) to the photodiode 80.

Thus, the wavelength tunable filter 79 sequentially outputs the optical signal of channel (5), the optical signal of channel (6), the optical signal of channel (7), and the optical signal of channel (8) to the photodiode 80.

When having received the optical signal of channel (i) (i=5, 6, 7, 8) from the wavelength tunable filter 79, the photodiode 80 measures the intensity of the optical signal of channel (i).

The photodiode 80 outputs the measurement value $P_{OCMi}$ indicating the intensity of the optical signal of channel (i) to the controller 81 (step ST3 in FIG. 6).

When having received the measurement value $P_{OCMi}$ from the photodiode 80, the controller 81 outputs the measurement value $P_{OCMi}$ to the controller 82.

The leakage amount calculating unit 83 of the controller 82 calculates, from the measurement value $P_{PD}$ and the measurement value $P_{OCMi}$, an approximate value $P_{lk}$ of the leakage amount of light leaking from optical signals of other channels to each of the optical signals of the one or more channels included in the wavelength division multiplexed signal $W_7$ as expressed in the following Equation (1) (step ST4 in FIG. 6).

$$P_{lk} = \frac{\sum_{i=a}^{b} (P_{OCMi}) - P_{PD}}{2(b-(a-1))-2} \qquad (1)$$

In a case where the optical signals included in the wavelength division multiplexed signal $W_7$ are the optical signals of channels (5) to (8), in Equation (1) a=5 and b=8.

The leakage amount calculating unit 83 acquires the wavelength information output from the wavelength selective switch 71.

The leakage amount calculating unit 83 calculates, from the wavelength information and the approximate value $P_{lk}$ of the leakage amount of light, a leakage amount $P_{lki}$ of light leaking from optical signals of other channels to each of the optical signals of the one or more channels included in the wavelength division multiplexed signal $W_7$.

Hereinafter, the calculation process of the leakage amount $P_{lki}$ of light by the leakage amount calculating unit 83 will be specifically described.

The leakage amount calculating unit 83 refers to the wavelength information and determines whether or not the wavelengths $\lambda_{i-1}$ and $\lambda_{i+1}$ are used which are adjacent to the wavelength $\lambda_i$ assigned to the optical signal of channel (i) included in the wavelength division multiplexed signal $W_7$.

For example, the wavelengths adjacent to the wavelength $\lambda_5$ assigned to the optical signal of channel (5) are a wavelength $\lambda_4$ and the wavelength $\lambda_6$. Since the wavelength division multiplexed signal $W_7$ includes the optical signal of channel (6), the wavelength $\lambda_6$ is used. Since the wavelength division multiplexed signal $W_7$ does not include the optical signal of channel (4), the wavelength $\lambda_4$ is not used.

Therefore, the attenuation amount calculating unit 84 determines that, for the wavelength $\lambda_5$ assigned to the optical signal of channel (5), as the adjacent wavelength, the wavelength $\lambda_6$ is used, but the wavelength $\lambda_4$ is not used.

Moreover, for example, the wavelengths adjacent to the wavelength $\lambda_6$ assigned to the optical signal of channel (6) are the wavelength $\lambda_5$ and the wavelength $\lambda_7$. Since the wavelength division multiplexed signal $W_7$ includes each of the optical signal of channel (5) and the optical signal of channel (7), the wavelengths $\lambda_5$ and $\lambda_7$ are each used.

Therefore, the attenuation amount calculating unit 84 determines that, for the wavelength $\lambda_6$ assigned to the optical signal of channel (6), the wavelength $\lambda_5$ and the wavelength $\lambda_7$ are each used as the adjacent wavelengths.

The leakage amount calculating unit 83 determines an adjacent parameter $s_i$ corresponding to the optical signal of channel (i) on the basis of whether or not the wavelengths $\lambda_{i-1}$ and $k_{i+1}$ adjacent to the wavelength $\lambda_i$ assigned to the optical signal of channel (i) are used (step ST5 in FIG. 6).

Specifically, the leakage amount calculating unit 83 determines the adjacent parameter $s_i$ corresponding to the optical signal of channel (i) in the following manner.

| Whether Wavelength $\lambda_{i-1}$ Is in Use | Whether Wavelength $\lambda_{i+1}$ Is in Use | $s_i$ |
| --- | --- | --- |
| Not in Use | Not in Use | ->0 |
| Not in Use | In Use | ->1 |
| In Use | Not in Use | ->1 |
| In Use | In Use | ->2 |

Therefore, the adjacent parameter $s_5$ corresponding to the optical signal of channel (5) is 1, and the adjacent parameter $s_6$ corresponding to the optical signal of channel (6) is 2.

In addition, the adjacent parameter $s_7$ corresponding to the optical signal of channel (7) is 2, and the adjacent parameter $s_8$ corresponding to the optical signal of channel (8) is 1.

The leakage amount calculating unit 83 calculates, from the approximate value $P_{lk}$ of the leakage amount of light and the adjacent parameter $s_i$, the leakage amount $P_{lki}$ of light leaking from other channels to channel (i) as expressed in the following Equation (2) (step ST6 in FIG. 6).

$$P_{lki} = s_i P_{lk} \qquad (2)$$

The attenuation amount calculating unit 84 calculates a control target value $P_{Gi}$ the optical signal of channel (i) from the measurement value $P_{OCMi}$ indicating the intensity of the optical signal of channel (i) and the leakage amount of light $P_{lki}$ as expressed in the following Equation (3) (step ST7 in FIG. 6).

$$P_{Gi} = P_{OCMi} - P_{lki} \qquad (3)$$

Next, the attenuation amount calculating unit 84 calculates an error $P_{ERRi}$ between the measurement value $P_{OCMi}$ indicating the intensity of the optical signal of channel (i) and the control target value $P_{Gi}$ of the optical signal of channel (i) (hereinafter simply referred to as "error $P_{ERRi}$ of channel (i)") as expressed in the following Equation (4).

$$P_{ERRi} = P_{OCMi} - \alpha P_{Gi} \qquad (4)$$

In Equation (4), $\alpha$ is a control parameter set in advance. For example, $0 < \alpha < 3$.

Next, the attenuation amount calculating unit 84 calculates the attenuation amount $P_{ATTi}$ of the optical signal of channel (i) from the initial value $P_{ATTi0}$ of the attenuation amount set in advance and the error $P_{ERRi}$ of channel (i) as expressed in the following Equation (5) (step ST8 in FIG. 6).

$$P_{ATTi} = P_{ATTi0} + P_{ERRi} \qquad (5)$$

The attenuation amount calculating unit 84 outputs the attenuation $P_{ATTi}$ of the optical signal of channel (i) to the wavelength selective switch 71.

Of the one or more variable optical attenuators 71*a* included in the wavelength selective switch 71, the variable optical attenuator 71*a* corresponding to channel (i) attenuates the optical signal of channel (i) depending on the attenuation amount $P_{ATTi}$ of the optical signal of channel (i) output from the attenuation amount calculating unit 84 (step ST9 in FIG. 6).

When the variable optical attenuators 71*a* corresponding to channels (5) to (8) attenuate the optical signals of channels (5) to (8), respectively, then the wavelength selective switch 71 outputs the wavelength division multiplexed signal $W_7$ including the attenuated optical signals of channels (5) to (8) to the output-side transmission line 74.

Figure 7:
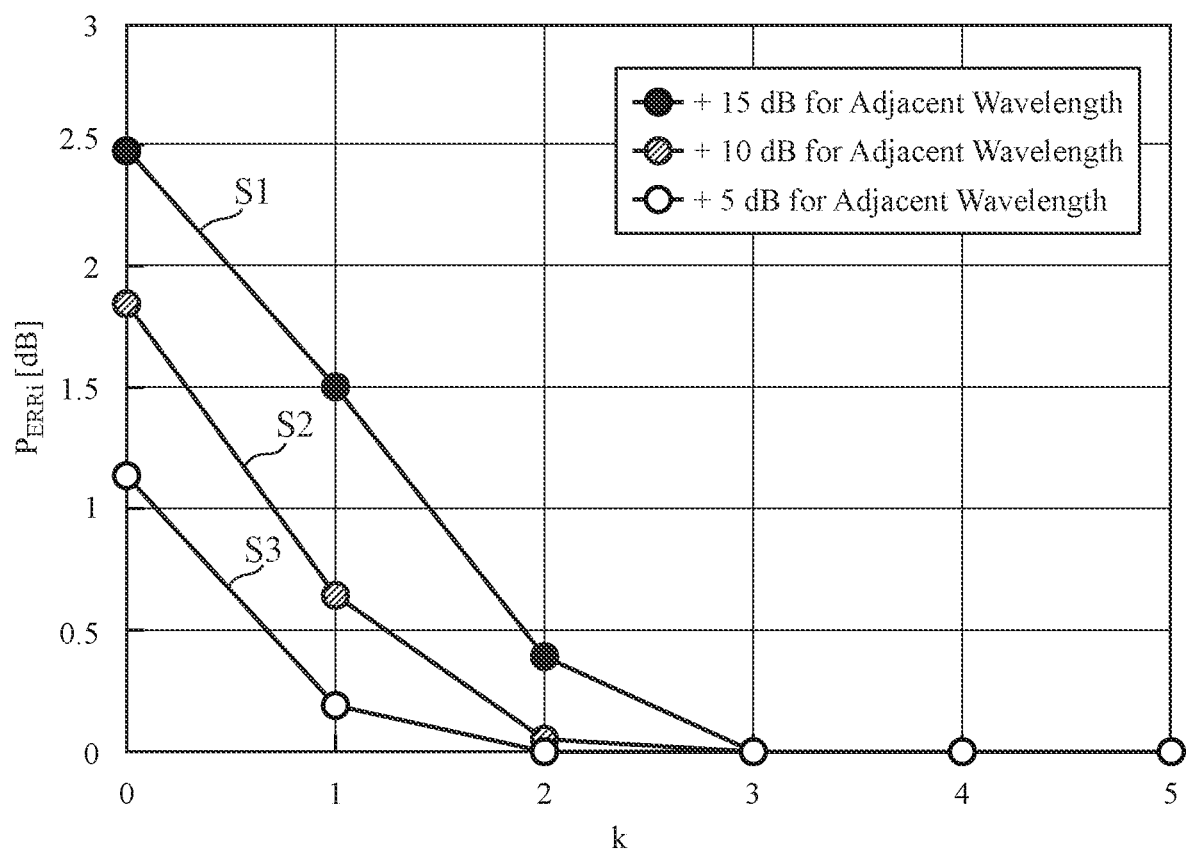
FIG. 7 is an explanatory graph illustrating a result of simulation of the transition of an error $P_{ERRi}$ of channel (i) in a case where light intensities of optical signals of adjacent channels (channel (i−1) and channel (i+1)) are higher than the light intensity of the optical signal of channel (i).

FIG. 7 is an explanatory graph illustrating a result of simulation of the transition of the error $P_{ERRi}$ of channel (i) in a case where light intensities of optical signals of the adjacent channels (channel (i−1) and channel (i+1)) are higher than the light intensity of the optical signal of channel (i).

In FIG. 7, the horizontal axis indicates the number of times of feedback control k of the optical signal of channel (i) by the optical signal control device 70, and the vertical axis indicates the error $P_{ERRi}$ of channel (i) as of the time when k-th feedback control is performed.

The simulation conditions are as follows.

(1) The interval between the wavelength $\lambda_{i-1}$ assigned to the optical signal of channel (i−1) and the wavelength $\lambda_i$ assigned to the optical signal of channel (i) is 50 GHz.

The interval between the wavelength $\lambda_i$ assigned to the optical signal of channel (i) and the wavelength $\lambda_{i+1}$ assigned to the optical signal of channel (i+1) is 50 GHz.

(2) The full width at half maximum at each of channels (i−1), (i) and (i+1) multiplexed into the wavelength division multiplexed signal $W_7$ is 50 GHz.

(3) The wavelength profile of the wavelength tunable filter 79 is a Gaussian type having a full width at half maximum of 40 GHz.

(4) The control parameter a is 2.

In FIG. 7, S1 represents the simulation result in a case where the light intensity of an optical signal of an adjacent channel is 15 dB greater than the light intensity of the optical signal of channel (i).

Line S2 represents the simulation result in a case where the light intensity of an optical signal of an adjacent channel is 10 dB greater than the light intensity of the optical signal of channel (i).

Line S3 represents the simulation result in a case where the light intensity of an optical signal of an adjacent channel is 5 dB greater than the light intensity of the optical signal of channel (i).

Among the simulation results S1 to S3, S1 represents the simulation result in which the difference between the light intensity of the optical signal of channel (i) and the light intensity of an optical signal of an adjacent channel is the greatest.

Even in a case where the difference between the light intensity of the optical signal of channel (i) and the light intensity of the optical signal of an adjacent channel is very large being 15 dB, the optical signal control device 70 performs feedback the optical signal of channel (i) twice, thereby allowing the error $P_{ERRi}$ of channel (i) to converge within 0.5 dB.

Therefore, it can be understood that the error $P_{ERRi}$ of channel (i) is reduced by the feedback control of the optical signal of channel (i) by the optical signal control device 70.

In the first embodiment, the optical signal control device 70 is configured to include: the leakage amount calculating unit 83 calculating, from the light intensity measured by the first light intensity measuring unit 77 and the light intensity measured by the second light intensity measuring unit 78, a leakage amount of light leaking from other optical signals to each of the optical signals included in the combined signal; and the attenuation amount calculating unit 84 calculating, from the light intensity measured by the second light intensity measuring unit 78 and the leakage mount of light, an attenuation amount of each of the optical signals included in the combined signal, and the wavelength selective switch 71 attenuates each of the optical signals included in the combined signal depending on the attenuation amount calculated by the attenuation amount calculating unit 84. Therefore, the optical signal control device 70 can reduce an error in the light intensity in each of one or more optical signals included in a combined signal.

In the optical signal control device 70 according to the first embodiment, an example in which the wavelength selective switch 71 outputs the wavelength information to the controller 82 is illustrated; however, it is not limited thereto.

Figure 8:
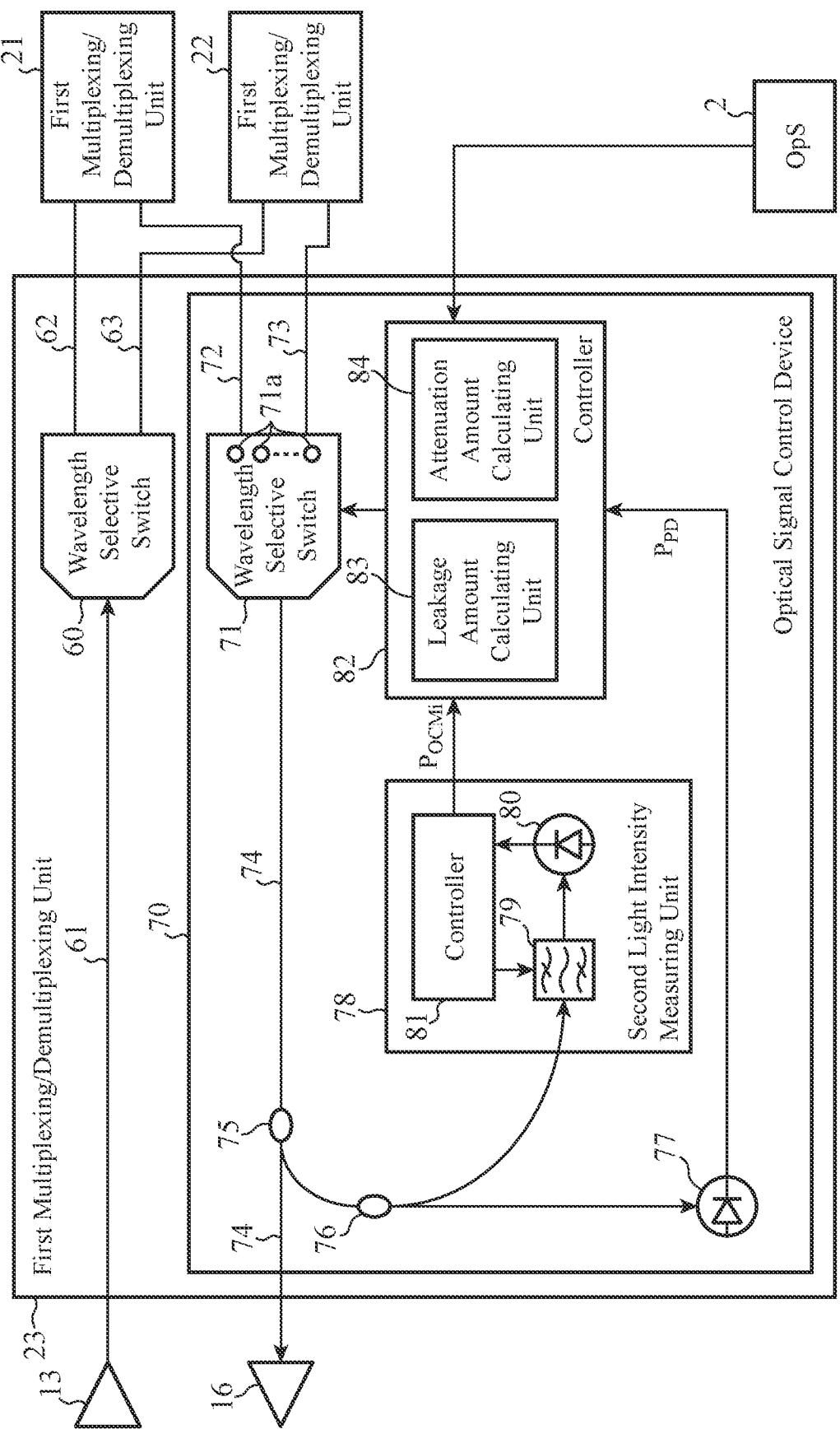
FIG. 8 is a configuration diagram illustrating the first multiplexing/demultiplexing unit 23 including another optical signal control device 70 according to the first embodiment.

For example, as illustrated in FIG. 8, the OpS 2 may output wavelength information to the controller 82.

The OpS 2 is a device for setting a signal source/destination to each of the OXCs 1-1 to 1-4, and thus is capable of outputting wavelength information to the controller 82.

FIG. 8 is a configuration diagram illustrating the first multiplexing/demultiplexing unit 23 including another optical signal control device 70 according to the first embodiment. In FIG. 8, the same symbols as those in FIG. 3 denote the same or corresponding parts.

In the other optical signal control device 70 according to the first embodiment, the OpS 2 outputs the wavelength information to the controller 82, and thus the signal path for the wavelength selective switch 71 to output the wavelength information to the controller 82 is not required.

In the optical signal control device 70 according to the first embodiment, an example in which the leakage amount calculating unit 83 determines the adjacent parameter $s_i$ depending on the wavelength information is illustrated; however, it is not limited thereto.

For example, the OpS 2 may determine the adjacent parameter $s_i$ depending on the wavelength information and may output the adjacent parameter $s_i$ to the controller 82.

In a case where the OpS 2 outputs the adjacent parameter $s_i$ to the controller 82, the processing load on the leakage amount calculating unit 83 is reduced.

Second Embodiment

The optical signal control device 70 according to the first embodiment performs the calculations of Equations (1) to (5) each time each of the optical signals included in the combined signal is attenuated.

However, the leakage amount $P_{lki}$ of light hardly changes when the combination of channels corresponding to one or more optical signals to be included in the wavelength division multiplexed signal $W_7$ by the wavelength selective switch 71 is constant.

Therefore, in a case where the combination of channels corresponding to the one or more optical signals to be included in the wavelength division multiplexed signal $W_7$ by the wavelength selective switch 71 is constant, the calculations of Equations (1) and (2) may be performed only at the first time of the feedback control. The first time of the feedback control is, for example, feedback control that the optical signal control device 70 performs first after being activated.

In the second embodiment, an optical signal control device 70 will be described which performs the calculations of Equations (1) to (5) only at the first time of the feedback control and performs only the calculations of Equations (3) to (5) at the second and subsequent times of feedback control.

At the second and subsequent times of feedback control, the optical signal control device 70 performs calculation of Equations (3) to (5) using the calculation results of Equations (1) and (2) performed at the first time of the feedback control.

Specifically, the leakage amount calculating unit 83 calculates the leakage amount $P_{lki}$ of light by performing calculation of Equations (1) and (2) only at the first time of feedback control.

The leakage amount calculating unit 83 does not calculate the leakage amount $P_{lki}$ of light at the second and subsequent times of feedback control.

The attenuation amount calculating unit 84 performs calculation of Equations (3) to (5) at all times of feedback control.

That is, at all times of feedback control, the attenuation amount calculating unit 84 calculates the attenuation amount $P_{ATTi}$ of the optical signal of channel (i) using the leakage amount $P_{lki}$ of light calculated at the first time of the feedback control.

The optical signal control device 70 according to the second embodiment can reduce an error in light intensity in each of optical signals of one or more channels like the optical signal control device 70 of the first embodiment.

Furthermore, since the optical signal control device 70 according to the second embodiment does not need to calculate the leakage amount $P_{lki}$ of light at the second and subsequent times of feedback controls, the processing load can be reduced.

Although the example has been illustrated in which the optical signal control device 70 of the second embodiment performs calculation of Equations (1) and (2) only at the first time of feedback control, it is not limited thereto.

For example, the leakage amount calculating unit 83 may calculate Equations (1) and (2) also when the combination of channels of optical signal to be included in the wavelength division multiplexed signal $W_7$ changes.

The leakage amount calculating unit 83 can recognize that the combination of channels of optical signals to be included in the wavelength division multiplexed signal $W_7$ is changed by recognizing that a signal source/destination set by the OpS 2 has been changed.

When the leakage amount calculating unit 83 calculates the leakage amount $P_{lki}$ of light at the time when the combination of channels changes, the attenuation amount calculating unit 84 performs calculation of Equations (3) to (5) using the leakage amount $P_{lki}$ of light calculated when the combination of channels changes.

Third Embodiment

In the optical signal control device 70 according to the first embodiment, the leakage amount calculating unit 83 calculates the leakage amount $P_{lki}$ of light from the measurement value $P_{PD}$, the measurement value $P_{OCMi}$, and the wavelength information.

In the leakage amount calculating unit 83, when calculating the leakage amount PH, of light, the possibility that noise light may be superimposed on each of the wavelength division multiplexed signal $W_4$ and the wavelength division multiplexed signal $W_6$ input to the wavelength selective switch 71 is not considered.

Practically, there are cases where noise light due to amplified spontaneous emission (ASE) light may be superimposed on each of the wavelength division multiplexed signal $W_4$ and the wavelength division multiplexed signal $W_6$. The noise light is a factor that affects the calculation result of the leakage amount $P_{lki}$ of light.

In the third embodiment, an optical signal control device 70 will be described in which a leakage amount calculating unit 85 calculates the leakage amount $P_{lki}$ of light in consideration of noise light.

Figure 9:
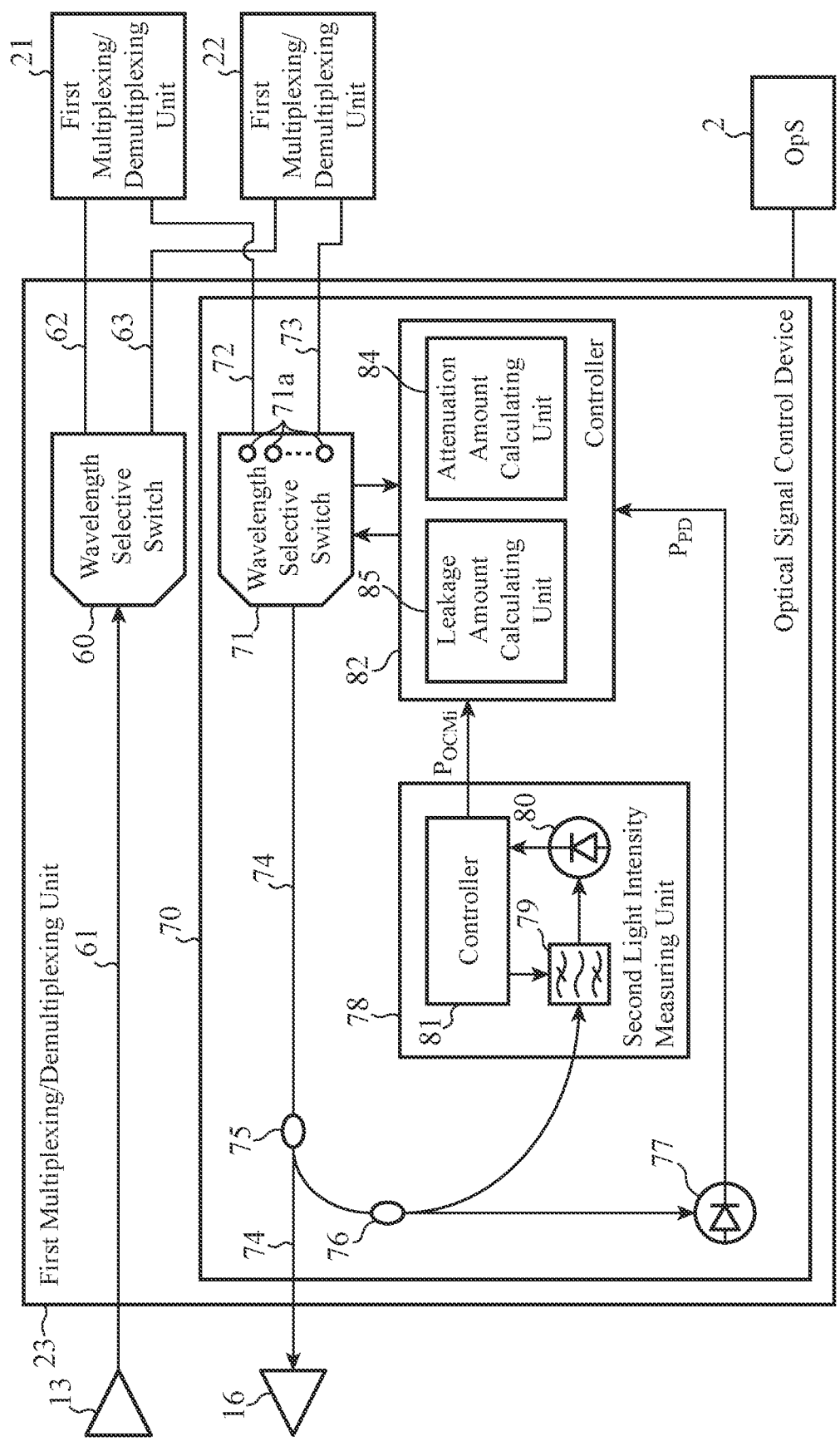
FIG. 9 is a configuration diagram illustrating a first multiplexing/demultiplexing unit 23 including an optical signal control device 70 according to a third embodiment.

FIG. 9 is a configuration diagram illustrating a first multiplexing/demultiplexing unit 23 including the optical signal control device 70 according to the third embodiment.

In FIG. 9, the same symbol as that in FIGS. 3 and 8 represents the same or a corresponding part and thus description thereof is omitted.

The leakage amount calculating unit 85 is implemented by, for example, the leakage amount calculating circuit 91 illustrated in FIG. 4.

The leakage amount calculating unit 85 performs the process of detecting noise light $P_{ASE}$ that is superimposed on each of optical signals of one or more channels included in the wavelength division multiplexed signal $W_7$.

The leakage amount calculating unit 85 performs the process of calculating the leakage amount $P_{lki}$ of light from a measurement value $P_{PD}$ output from a first light intensity measuring unit 77, a measurement value $P_{OCMi}$ output from a second light intensity measuring unit 78, wavelength information, and the noise light $P_{ASE}$.

Next, the operation of the optical signal control device 70 illustrated in FIG. 9 will be described. However, since the operation of components other than that of the leakage amount calculating unit 85 is similar to that of the first embodiment, only the operation of the leakage amount calculating unit 85 will be described here.

The leakage amount calculating unit 85 acquires wavelength information from a wavelength selective switch 71. Here, the example is illustrated in which the leakage amount calculating unit 85 acquires the wavelength information from the wavelength selective switch 71; however, as illustrated in FIG. 8, the leakage amount calculating unit 85 may acquire the wavelength information from the OpS 2 in a case where the controller 82 is connected with the OpS 2.

The leakage amount calculating unit 85 refers to the wavelength information and recognizes the wavelengths assigned to optical signals of one or more channels included in the wavelength division multiplexed signal $W_7$, thereby specifying wavelengths assigned to optical signals of channels not included in the wavelength division multiplexed signal $W_7$.

For example, if the one or more channels included in the wavelength division multiplexed signal $W_7$ are channels (5) to (8), channels such as channels (1) to (4) are not included in the wavelength division multiplexed signal $W_7$.

If channels not included in the wavelength division multiplexed signal $W_7$ are channels (1) to (4), the leakage amount calculating unit 85 specifies the wavelengths $\lambda_1$, $\lambda_2$, $\lambda_3$, and $\lambda_4$ assigned to the optical signals of channels (1) to (4), respectively.

The leakage amount calculating unit 85 includes, for example, a wavelength tunable filter similar to a wavelength tunable filter 79, and extracts the optical signals of channels (1) to (4) from the wavelength division multiplexed signal $W_7$ by sweeping with the wavelengths $\lambda_1$, $\lambda_2$, $\lambda_3$, and $\lambda_4$ in order.

The optical signals of channels (1) to (4) do not include a so-called main signal, and therefore include only noise light.

The leakage amount calculating unit 85 includes, for example, a photodiode similar to a photodiode 80, and measures light intensities $P_{ASE1}$, $P_{ASE2}$, $P_{ASE3}$, and $P_{ASE4}$ of the optical signals of channels (1) to (4), respectively.

The leakage amount calculating unit 85 calculates the average value of the light intensities $P_{ASE1}$, $P_{ASE2}$, $P_{ASE3}$, and $P_{ASE4}$ measured individually as expressed in the following Equation (6) as the noise light $P_{ASE}$.

$$P_{ASE} = \frac{P_{ASE1} + P_{ASE2} + P_{ASE3}\, P_{ASE4}}{4} \quad (6)$$

Here, the example has been illustrated in which the leakage amount calculating unit 85 calculates the average value of the light intensities $P_{ASE1}$, $P_{ASE2}$, $P_{ASE3}$, and $P_{ASE4}$ as the noise light $P_{ASE}$; however it is not limited thereto.

For example, the leakage amount calculating unit 85 may use any one of the light intensities $P_{ASE1}$, $P_{ASE2}$, $P_{ASE3}$, and $P_{ASE4}$ as the noise light $P_{ASE}$.

The leakage amount calculating unit 85 calculates, from the measurement value $P_{PD}$, the measurement value $P_{OCMi}$, and the noise light $P_{ASE}$, the approximate value $P_{lk}$ of the leakage amount of light leaking from other channels to each of the one or more channels included in the wavelength division multiplexed signal $W_7$ as illustrated in the following Foliation (7)

$$P_{lk} = \frac{\sum_{i=a}^{b}(P_{OCMi}) - (P_{PD} - (b-(a-1))P_{ASE})}{2(b-(a-1))-2} \quad (7)$$

The leakage amount calculating unit 85 calculates, from the approximate value $P_{lk}$ of the leakage amount of light and the adjacent parameter $s_i$, the leakage amount $P_{lki}$ of light leaking from other channels to channel (i) as expressed in Equation (2).

The leakage amount calculating unit 85 outputs the leakage amount $P_{lki}$ of light to an attenuation amount calculating unit 84.

In the third embodiment described above, the optical signal control device 70 is configured so as to calculate the leakage amount $P_{lki}$ of light from the measurement value $P_{PD}$ output from the first light intensity measuring unit 77, the measurement value $P_{OCMi}$ output from the second light intensity measuring unit 78, and the noise light $P_{ASE}$. Therefore, the optical signal control device 70 can calculate the leakage amount $P_{lki}$ of light with higher accuracy than in the first embodiment, and thus errors in the light intensity can be further reduced than in the first embodiment.

Note that the present invention may include a flexible combination of each of the embodiments, a modification of any component of each of the embodiments, or an omission of any component in each of the embodiments within the scope of the present invention.

INDUSTRIAL APPLICABILITY

The present invention is suitable for an optical signal control device for attenuating each optical signal in one or more channels.

The present invention is also suitable for an optical communication system in which multiple optical cross-connects are connected by transmission lines.

REFERENCE SIGNS LIST

1-1 to 1-4: OXC, 2: OpS, 3-2 to 3-4: transmission line, 11 to 16: optical amplifier, 21 to 23: first multiplexing/demultiplexing unit, 31, 32: second multiplexing/demultiplexing unit, 41 to 44: TPND, 45 to 48: communication path, 51 to 54: client terminal, 60: wavelength selective switch, 70: optical signal control device, 61 to 63: optical fiber, 71: wavelength selective switch, 71a: variable optical attenuator, 72, 73: input-side transmission line, 74: output-side transmission line, 75, 76: optical multiplexing/demultiplexing element, 77: first light intensity measuring unit, 78: second light intensity measuring unit, 79: wavelength tunable filter, 80: photodiode, 81: controller, 82: controller, 83, 85: leakage amount calculating unit, 84: attenuation amount calculating unit, 91: leakage amount calculating circuit, 92: attenuation amount calculating circuit, 101: memory, 102: processor

The invention claimed is:

1. An optical signal control device comprising:
a wavelength selective switch outputting a combined signal obtained by combining all the wavelength division multiplexed signals to an output-side transmission line when wavelength division multiplexed signals, in which one or more optical signals are multiplexed, are transmitted through one or more input-side transmission lines;
a first light intensity measuring unit measuring a light intensity of the combined signal;
a second light intensity measuring unit measuring a light intensity of each of optical signals included in the combined signal;
a leakage amount calculating unit calculating, from the light intensity measured by the first light intensity measuring unit and the light intensity measured by the second light intensity measuring unit, a leakage amount of light leaking from other optical signals to each of the optical signals included in the combined signal; and
an attenuation amount calculating unit calculating, from the light intensity measured by the second light intensity measuring unit and the leakage amount of light, an attenuation amount of each of the optical signals included in the combined signal,
wherein the wavelength selective switch attenuates each of the optical signals included in the combined signal depending on the attenuation amount calculated by the attenuation amount calculating unit.

2. The optical signal control device according to claim 1, wherein the leakage amount calculating unit calculates the leakage amount of light using wavelength information indicating a wavelength assigned to each of the one or more optical signals included in the combined signal.

3. The optical signal control device according to claim 1, wherein the second light intensity measuring unit comprises:
a wavelength tunable filter extracting each of the optical signals included in the combined signal; and
a photodiode measuring an intensity of each of the optical signals extracted by the wavelength tunable filter.

4. The optical signal control device according to claim 1, wherein, in feedback control by the first light intensity measuring unit, the second light intensity measuring unit, the leakage amount calculating unit, the attenuation amount calculating unit, and the wavelength selective switch, the leakage amount calculating unit calculates the leakage amount of light only at a first time of the feedback control, and
the attenuation amount calculating unit calculates, at all times of the feedback control, the attenuation amount of each of the optical signals included in the combined signal from the light intensity measured by the second light intensity measuring unit and the leakage amount of light calculated at the first time of the feedback control.

5. The optical signal control device according to claim 4, wherein the leakage amount calculating unit calculates the leakage amount of light also when a combination of optical signals included in the combined signal is hanged, and
the attenuation amount calculating unit calculates an attenuation amount of each of the optical signals included the combined signal from the light intensity measured by the second light intensity measuring unit and the leakage amount of light calculated when the combination is changed.

6. The optical signal control device according to claim 1, wherein the leakage amount calculating unit calculates the leakage amount of light leaking from other optical signals to each of the optical signals included in the combined signal from the light intensity measured by the first light intensity measuring unit, the light intensity measured by the second light intensity measuring unit, and noise light superimposed on each of the optical signals included in the combined signal.

7. An optical communication system comprising:
multiple optical cross-connects connected by transmission lines,
wherein each of the multiple optical cross-connects comprises an optical signal control device, the optical signal control device comprising:
a wavelength selective switch outputting a combined signal obtained by combining all the wavelength division multiplexed signals to an output-side transmission line when wavelength division multiplexed signals, in which one or more optical signals are multiplexed, are transmitted through one or more input-side transmission lines;

a first light intensity measuring unit measuring a light intensity of the combined signal;

a second light intensity measuring unit measuring a light intensity of each of optical signals included in the combined signal;

a leakage amount calculating unit calculating, from the light intensity measured by the first light intensity measuring unit and the light intensity measured by the second light intensity measuring unit, a leakage amount of light leaking from other optical signals to each of the optical signals included in the combined signal; and an attenuation amount calculating unit calculating, from the light intensity measured by the second light intensity measuring unit and the leakage mount of light, an attenuation amount of each of the optical signals included in the combined signal, and the wavelength selective switch attenuates each of the optical signals included in the combined signal depending on the attenuation amount calculated by the attenuation amount calculating unit.

* * * * *